United States Patent
Park et al.

(10) Patent No.: US 11,089,127 B2
(45) Date of Patent: *Aug. 10, 2021

(54) ELECTRONIC DEVICE AND METHOD FOR PROVIDING IP NETWORK SERVICE

(71) Applicant: Samsung Electronics Co., Ltd., Suwon-si (KR)

(72) Inventors: Dong-Hoo Park, Seoul (KR); Kyoung-Youp Park, Suwon-si (KR); Yun-Han Kim, Suwon-si (KR); Young-Man Park, Gwangju (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,721

(22) Filed: May 18, 2020

(65) Prior Publication Data

US 2020/0280614 A1 Sep. 3, 2020

Related U.S. Application Data

(63) Continuation of application No. 14/837,988, filed on Aug. 27, 2015, now Pat. No. 10,659,549.

(30) Foreign Application Priority Data

Aug. 28, 2014 (KR) .......................... 10-2014-0113563

(51) Int. Cl.
*H04L 12/46* (2006.01)
*H04L 29/06* (2006.01)
(Continued)

(52) U.S. Cl.
CPC ...... *H04L 67/2823* (2013.01); *H04L 12/4633* (2013.01); *H04L 69/08* (2013.01);
(Continued)

(58) Field of Classification Search
CPC . H04L 12/4633; H04L 67/2823; H04L 69/08; H04L 2212/00; H04W 4/008; H04W 80/04
(Continued)

(56) References Cited

U.S. PATENT DOCUMENTS 7,324,515 B1 1/2008 Chapman
10,659,549 B2 * 5/2020 Park .................... H04L 67/2823
(Continued)

FOREIGN PATENT DOCUMENTS

CN 1568625 A 1/2005
CN 1905527 A 1/2007
(Continued)

OTHER PUBLICATIONS

Office Action dated May 29, 2020 in connection with India Patent Application No. 201717008978, 5 pages.
(Continued)

*Primary Examiner* — Melvin C Marcelo
*Assistant Examiner* — Natali Pascual Peguero

(57) ABSTRACT

An electronic device, according to one of the various embodiments of the present disclosure, includes: a memory; a communication module that transmits and receives messages; and a processor that, when a non-IP service-based message is received, creates an IP-based message including at least some of the non-IP service-based message, and provides the created IP-based message. In addition, various embodiments are provided.

12 Claims, 10 Drawing Sheets

(51) Int. Cl.
   *H04L 29/08* (2006.01)
   *H04W 4/80* (2018.01)
   *H04W 80/04* (2009.01)
(52) U.S. Cl.
   CPC .............. *H04W 4/80* (2018.02); *H04W 80/04* (2013.01); *H04L 2212/00* (2013.01)
(58) Field of Classification Search
   USPC .................................................. 370/329, 392
   See application file for complete search history.

(56) References Cited

U.S. PATENT DOCUMENTS

| | | |
|---|---|---|
| 2002/0078161 A1 | 6/2002 | Cheng |
| 2002/0173296 A1 | 11/2002 | Nordman et al. |
| 2003/0217174 A1 | 11/2003 | Dorenbosch et al. |
| 2004/0122991 A1 | 6/2004 | Ohnishi |
| 2006/0053229 A1 | 3/2006 | Choi et al. |
| 2007/0030848 A1 | 2/2007 | Miyata et al. |
| 2007/0087790 A1 | 4/2007 | Worick et al. |
| 2007/0287430 A1 | 12/2007 | Hosain et al. |
| 2008/0091175 A1 | 4/2008 | Frikart et al. |
| 2008/0279127 A1 | 11/2008 | Venkatachalam et al. |
| 2009/0161624 A1 | 6/2009 | Johnson et al. |
| 2009/0231960 A1 | 9/2009 | Hutcheson |
| 2011/0149932 A1 | 6/2011 | Kim et al. |
| 2011/0153793 A1 | 6/2011 | Tan |
| 2013/0006435 A1 | 1/2013 | Berrios et al. |
| 2013/0058266 A1 | 3/2013 | Li et al. |
| 2013/0223280 A1* | 8/2013 | Choi ..................... H04W 76/10 370/254 |
| 2013/0246565 A1 | 9/2013 | Froelicher et al. |
| 2014/0211973 A1 | 7/2014 | Wang et al. |
| 2015/0040173 A1 | 2/2015 | Panagos et al. |

FOREIGN PATENT DOCUMENTS

| | | |
|---|---|---|
| CN | 101557657 A | 10/2009 |
| CN | 102055774 A | 5/2011 |
| CN | 102657992 A | 1/2013 |
| CN | 103686584 A | 3/2014 |
| EP | 2388975 A1 | 11/2011 |
| JP | 2004194243 A | 7/2004 |
| KR | 10-2004-0045806 A | 6/2004 |
| KR | 10-2013-0050182 A | 5/2013 |
| WO | 2014037779 A1 | 3/2014 |

OTHER PUBLICATIONS

International Search Report dated Dec. 4, 2015 in connection with International Patent Application No. PCT/KR2015/008979; 3 pages.

International Written Opinion dated Dec. 4, 2015 in connection with International Patent Application No. PCT/KR2015/008979; 7 pages.

Extended European Search Report dated Jan. 20, 2016 in connection with European Application No. 15182733.4, 11 pages.

Reen-Cheng Wang, et al., "Internetworking Between ZigBee/802.15.4 and IPv6/802.3 Network", IEEE, vol. 8021543, Aug. 1, 2007, XP055088015, 6 pages.

Communication from a foreign patent office in a counterpart foreign application, European Patent Office, "Communication pursuant to Article 94(3) EPC," Application No. EP 15182733.4, dated May 2, 2018, 13 pages.

Office Action dated Oct. 15, 2018 in connection with European Patent Application No. 15 182 733.4, 5 pages.

China National Intellectual Property Administration, "Notification of the First Office Action," Application No. CN201580046039.X, dated Feb. 2019, 19 pages.

\* cited by examiner

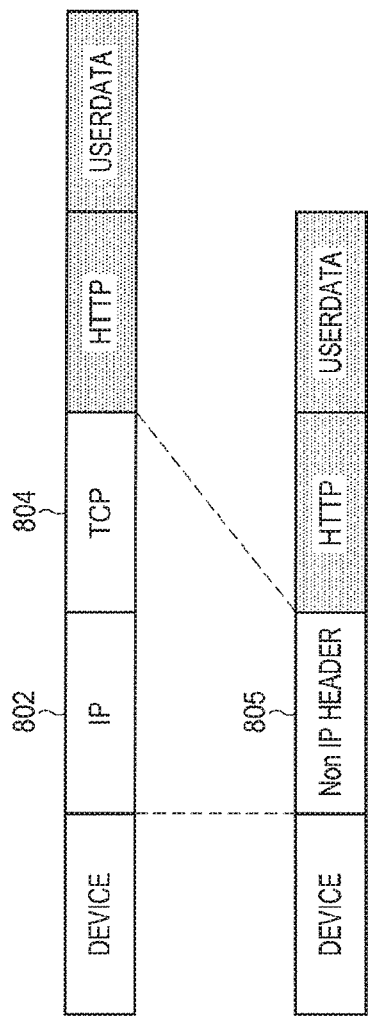

ELECTRONIC DEVICE AND METHOD FOR PROVIDING IP NETWORK SERVICE

CROSS-REFERENCE TO RELATED APPLICATIONS

This application is a continuation of U.S. patent application Ser. No. 14/837,988, filed on Aug. 27, 2015, which is based on and claims priority under 35 U.S.C. § 119 to Korean Patent Application No. 10-2014-0113563, which was filed in the Korean Intellectual Property Office on Aug. 28, 2014, the entire content of which is hereby incorporated by reference.

BACKGROUND

1. Field

The present disclosure relates to an electronic device, and more particularly to an IP network service method of an electronic device.

2. Description of Related Art

Recently, the remarkable development of information communication technology and semiconductor technology has brought wide spread and use of various electronic devices. Particularly, the latest electronic devices have been developed to be held for communication.

The electronic device selects one from among a plurality of network services, which are supported by the electronic device, and conducts communication between electronic devices, or between the electronic device and a server. For example, an electronic device, which can support an IP-based network service, communicates using the IP-based network service, and an electronic device, which can support another type of network service rather than the IP-based network, communicates using another type of network service.

In addition, recently developed technology shows that two electronic devices interwork with each other using applications installed therein.

SUMMARY

Meanwhile, in the case where one electronic device does not support the IP-based network service, whereas the other electronic device supports the IP-based network service, the network service used in interworking of the two electronic devices is different.

For example, although the application of one electronic device, which does not support the IP-based network service, can interwork with the application of the other electronic device, which supports the IP-based network service, to provide a similar function to each other, the applications thereof should be developed in different versions because the supported network services are different from each other. This requires additional time and manpower for the development.

More specifically, wearable electronic devices, such as a watch, a headset, or glasses, interwork with portable host electronic devices, such as a smart phone, a mobile phone, a notebook, or a net-book. If the wearable electronic device does not support the IP-based network service, but supports non-IP-based network service (e.g., BLUETOOTH communication), and the host electronic device supports the IP-based network service, the applications installed therein should be developed in different versions that support each service so that the wearable electronic device and the host electronic device interwork with each other. This requires additional time and manpower for the development.

To address the above-discussed deficiencies, it is a primary object to provide, for use in an electronic device and an IP network service method thereof, by which applications can be executed to make an electronic device, which supports the IP-based network service, interwork with an electronic device, which does not support the IP-based network service.

The present disclosure is implemented by the configuration below.

In accordance with an aspect of the present disclosure, an electronic device includes: a memory; a communication module that transmits and receives messages; and a processor that, when a non-IP service-based message is received, creates an IP-based message including at least some of the non-IP service-based message, and provides the created IP-based message.

In accordance with another aspect of the present disclosure, an IP network service method of an electronic device includes: creating a non-IP service-based message that includes at least some of an IP service-based message for transmitting and receiving the IP service-based message; and transmitting the non-IP service-based message including at least some of the IP service-based message.

In accordance with another aspect of the present disclosure, an IP network system includes: a first electronic device that creates and transmits a non-IP service-based message includes an IP request, and when a non-IP service-based response message is received, creates an IP response from the received non-IP service-based message; and a second electronic device that, when the non-IP service-based message is received from the first electronic device, creates the IP request from the received non-IP service-based message to thereby transmit the same to a server, and when the IP response is received from the server, creates the non-IP service-based response message including the IP response to thereby transmit the same to the first electronic device.

In accordance with another aspect of the present disclosure, an IP network service method includes: letting a first electronic device create and transmit a non-IP service-based message including an IP request; and letting a second electronic device create the IP request from the non-IP service-based message received from the first electronic device and transmit the same to a server.

The present disclosure, according to another embodiment, provides a recording medium for storing an IP network service program that executes, in an electronic device, the operations of: creating a non-IP service-based message including at least some of an IP service-based message for transmitting the IP service-based message; and transmitting the created non-IP service-based message.

In addition, the present disclosure, according to another embodiment, provides a recording medium for storing an IP network service program that executes, in an electronic device, the operations of: receiving a non-IP service-based message including at least some of an IP service-based message; and creating an IP service-based message from the received non-IP service-based message.

According to various embodiments of the present disclosure, the applications for the interworking between one electronic device, which supports the IP-based network service, and the other electronic device, which does not support the same, are not required to be developed in different versions.

In addition, according to various embodiments of the present disclosure, an application available for the IP-based network service can be used in an electronic device, which does not support the IP-based network service, by the interworking with an electronic device, which supports the IP-based network service.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A and 8B illustrate an IP message and a non-IP message according to one of various embodiments of the present disclosure;

DETAILED DESCRIPTION

Figure 1:
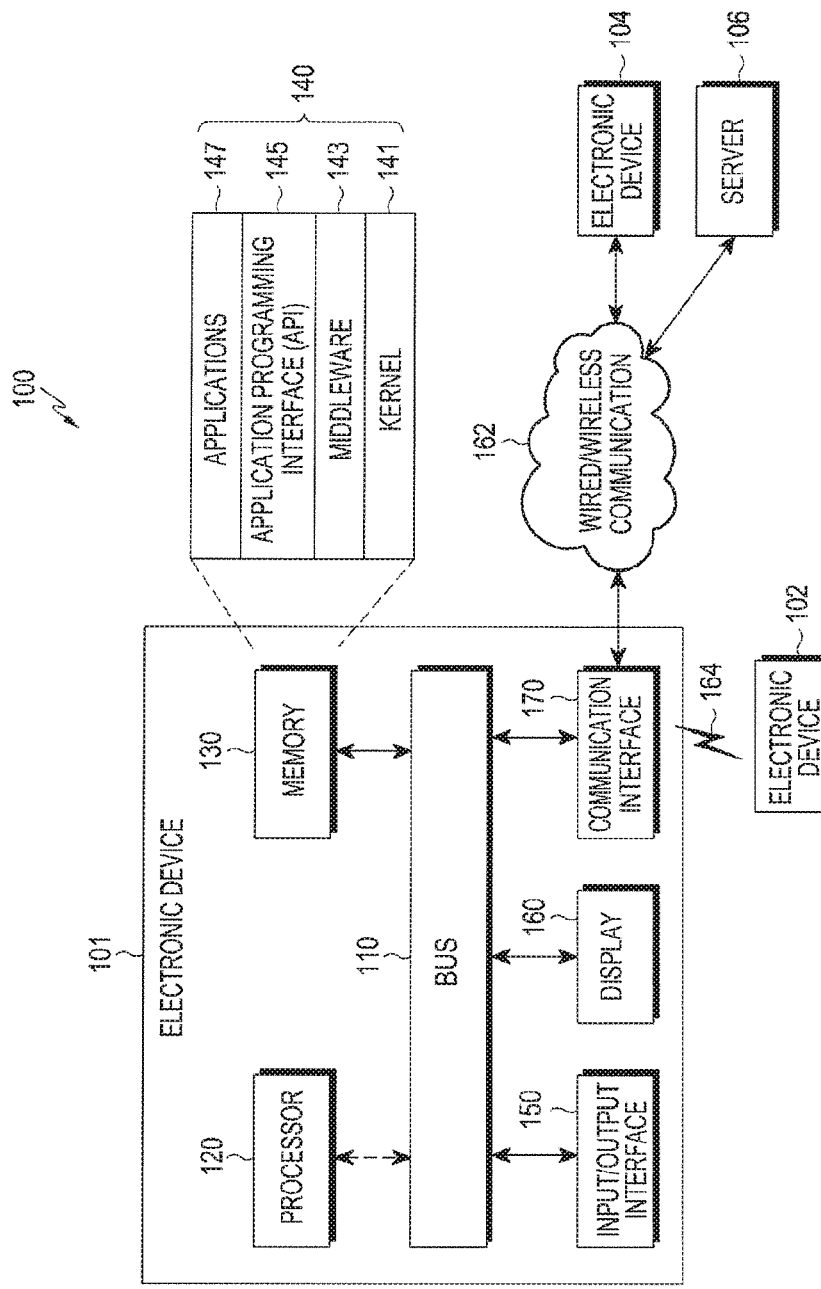
FIG. 1 illustrates an electronic device in a network environment according to various embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications device. Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals is used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B," "at least one of A or/and B," or "one or more of A or/and B" includes all possible combinations of the items listed. For example, the expression "A or B," "at least one of A and B," or "at least one of A or B" refers to all of (1) including at least one A, (2) including at least one B, or (3) including all of at least one A and at least one B.

The expression "a first," "a second," "the first," or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it is directly connected or coupled directly to the other element or any other element (e.g., third element) is interposer between them. In contrast, it is understood that when an element (e.g., first element) is referred to as being "directly connected," or "directly coupled" to another element (second element), there are no element (e.g., third element) interposed between them.

The expression "configured to" used in the present disclosure is exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" means that the device, together with other devices or components, "is able to." For example, the phrase "processor adapted (or configured) to perform A, B, and C" means a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

For example, the electronic device includes at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to certain embodiments, the electronic device is a smart home appliance. The home appliance include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., SAMSNG HOMESYNC, APPLE TV, or GOOGLE TV), a game console (e.g., XBOX and PLAYSTATION), an electronic dictionary, an electronic key, a camcorder, and an electronic photo frame.

According to another embodiment, the electronic device includes at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to certain embodiments, the electronic device includes at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure is a combination of one or more of the aforementioned various devices. The electronic device according to some embodiments of the present disclosure is a flexible device. Further, the electronic device according to various embodiments of the present disclosure is not limited to the aforementioned devices, and includes a new electronic device according to the development of technology.

Hereinafter, an electronic device according to various embodiments will be described with reference to the accompanying drawings. As used herein, the term "user" indicates a person who uses an electronic device or a device (e.g., an artificial intelligence electronic device) that uses an electronic device.

FIG. 1 shows an electronic device 101 in a network environment 100 according to various embodiments. The electronic device 101 includes a bus 110, a processor 120, a memory 130, an input/output interface 150, a display 160, and a communication interface 170. In another embodiment, one or more of the elements above are omitted from the electronic device 101, or other elements are added thereto.

The bus 110, for example, includes a circuit to connect elements 110 to 170 with each other, and to transfer communication signals (e.g., control messages and/or data) between the elements.

The processor 120 includes at least one of a central processing unit (CPU), an application processor (AP), or a communication processor (CP). The processor 120, for example, performs calculation or data processing in relation to the control and/or the communication of at least one element of the electronic device 101.

The memory 130 includes a volatile memory and/or a non-volatile memory. The memory 130 stores instructions or data, which are related to one or more elements of the electronic device 101. According to various embodiments, the memory 130 stores software and/or programs 140. The programs 140, for example, includes a kernel 141, a middleware 143, an application programming interface (API) 145, and/or application programs (or "applications") 147. Some of the kernel 141, the middle ware 143, or the API 145 are referred to as an operating system (OS).

The kernel 141 controls or manages system resources (e.g., the bus 110, the processor 120, the memory 130, or the like), which are used in performing operations or functions implemented by other programs (e.g., the middleware 143, the API 145 or the application programs 147). In addition, the kernel 141 provides interfaces by which the middleware 143, the API 145 or the application programs 147 accesses each element of the electronic device 101 for control or management.

The middleware 143 plays the intermediate role between the API 145 or the application programs 147, and the kernel 141 to communicate with each other for the transmission and reception of data. Furthermore, in relation to requests for operations received from the application programs 147, the middleware 143 controls (e.g., scheduling or load-balancing) the requests, for example, by determining priority for using system resources (e.g., the bus 110, the processor 120, the memory 130, or the like) of the electronic device 101 with respect to at least one of the application programs 147.

The API 145 is an interface by which the applications 147 controls functions provided by the kernel 141 or the middleware 143, and the API 145 includes, for example, at least one interface or function (e.g., instructions) for file control, window control, image processing, or text control.

The input/output interface 150 plays the role of an interface that transfers instructions or data input by a user or an external device to other elements of the electronic device 101. In addition, the input/output interface 150 outputs the instructions or the data, which are received from the other elements of the electronic device 101, to the user or the external device.

The display 160, for example, includes a liquid crystal display (LCD), a light-emitting diode (LED) display, an organic light-emitting diode (OLED) display, a micro-electromechanical system (MEMS) display, or an electronic paper display. The display 160, for example, displays various pieces of content (e.g., text, images, videos, icons, or symbols) to the user. The display 160 includes a touch screen, and for example, receives inputs, such as touches using electronic pens or user's body parts, gestures, proximity, or hovering.

The communication interface 170, for example, establishes communication between the electronic device 101 and the external electronic device (e.g., the first external electronic device 102, the second external electronic device 104, or a server 106). For example, the communication interface 170 is connected with a network 162 through wireless communication or wired communication to thereby communicate with the external electronic device (e.g., the second external electronic device 104, or a server 106).

The wireless communication uses at least one system of LTE, LTE-A, CDMA, WCDMA, UMTS, WiBro, or GSM. The wired communication includes at least one of a universal serial bus (USB), a high definition multimedia interface (HDMI), recommended standard 232 (RS-232), or a plain old telephone service (POTS). The network 162 includes one or more communication networks such as a computer network (e.g., LAN, or WAN), the Internet, or a telephone network.

The first and the second external electronic devices 102 and 104 are identical to or different from the electronic device 101. According to various embodiments, the server 106 includes a group of one or more servers. According to various embodiments, all of or some of the operations executed in the electronic device 101 are performed by one or more of the other electronic devices (e.g., the electronic devices 102 and 104, or the server 106). According to various embodiments, when the electronic device 101 needs to perform a certain function or service automatically or by a request, the electronic device 101 makes a request for at least some of the function related thereto to other devices (e.g., the electronic devices 102 and 104, or the server 106) instead of or in addition to performing the function or the service by itself. The other electronic devices (e.g., the electronic device 102 and 104, or the server 106) execute the requested function or the additional function, and transfer the result thereof to the electronic device 101. The electronic device 101 processes the received result as it is or additionally to provide the requested function or service. To this end, for example, technology of cloud computing, distribution computing, or client-server computing is utilized.

Figure 2:
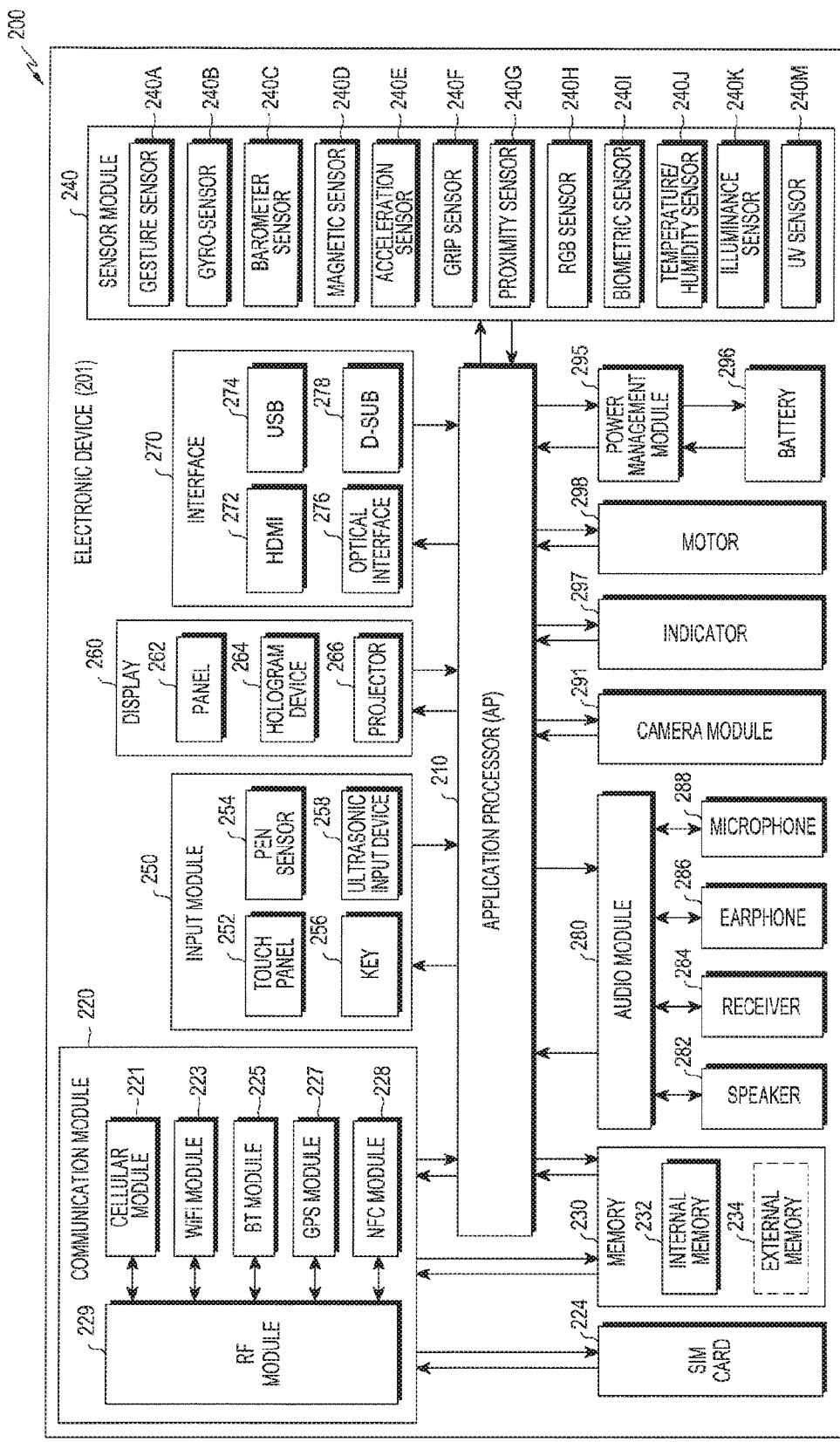
FIG. 2 illustrates an electronic device according to various embodiments of the present disclosure.

FIG. 2 is a block diagram 200 of an electronic device 201 according to various embodiments. The electronic device 201, for example, includes all of or a part of the electronic device 101 in FIG. 1. The electronic device 201 includes one or more application processors (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 controls a multitude of hardware or software elements connected with the AP 210 and perform data processing and calculation, by driving an operating system or application programs. The AP 210 is implemented, for example, by a system on chip (SoC). According to various embodiments, the AP 210 further includes a graphic processing unit (GPU) and/or an image signal processor. The AP 210 includes at least some (e.g., a cellular module 221) of the elements shown in FIG. 2. The AP 210 loads instructions or data received from at least one of other elements (e.g., the non-volatile memory) in the volatile memory to process the same, and stores various pieces of data in the non-volatile memory.

The communication module 220 comprises the identical or similar configuration to the communication interface 160 of FIG. 1. The communication module 220, for example, includes a cellular module 221, a Wi-Fi module 223, a BT module 225, a GPS module 227, an NFC module 228 and a radio frequency (RF) module 229.

The cellular module 221 provides services, such as voice calls, video calls, text messaging, or the Internet through communication networks. According to various embodiments, the cellular module 221 performs identification and authentication of the electronic device 201 in the communication network, using a subscriber identification module (e.g., a SIM card 224). According to various embodiments, the cellular module 221 performs at least some of the functions provided by the AP 210. According to various embodiments, the cellular module 221 includes a communication processor (CP).

Each of the Wi-Fi module 223, the BT module 225, the GPS module 227, or the NFC module 228 includes a processor for processing data transmitted and received through the corresponding module. According to various embodiments, at least some (e.g., two or more) of the cellular module 221, the Wi-Fi module 223, the BT module 225, the GPS module 227, or the NFC module 228 is included in one integrated chip (IC) or one IC package.

The RF module 229 transmits and receives communication signals (e.g., RF signals). The RF module 229 includes, for example, a transceiver, a power amp module (PAM), a frequency filter, a low noise amplifier (LNA), antennas, or the like. According to another embodiment, at least one of the cellular module 221, the Wi-Fi module 223, the BT module 225, the GPS module 227 and the NFC module 228 transmits and receives RF signals through a separated RF module.

The SIM card 224 includes a card, which adopts a subscriber identification module and/or an embedded SIM, and includes inherent identification information {e.g., an integrated circuit card identifier (ICCID)} or subscriber information { e.g., an international mobile subscriber identity (IMSI)}.

The memory 230 (e.g., the memory 130), for example, includes an internal memory 232 or an external memory 234. The internal memory 232 includes at least one of, for example, volatile memories (e.g., a dynamic RAM (DRAM), a static RAM (SRAM), a synchronous dynamic RAM (SDRAM), or the like), non-volatile memories (e.g., an one time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory, or the like), a hard drive, or a solid-state drive (SSD).

The external memory 234 further includes a flash drive, for example, a compact flash (CF), a secure digital (SD), a micro secure digital (Micro-SD), a mini secure digital (Mini-SD), an extreme digital (xD), a memory stick, or the like.

The external memory 234 is functionally and/or physically connected with the electronic device 201 through various interfaces.

The sensor module 240 measures physical quantities and detects an operation state of the electronic device 201, to thereby convert the measured or detected information to electric signals. The sensor module 240 includes at least one of, for example, a gesture sensor 240A, a gyro-sensor 240B, an atmospheric sensor 240C, a magnetic sensor 240D, an acceleration sensor 240E, a grip sensor 240F, a proximity sensor 240G, a color sensor 240H { e.g., a red-green-blue (RGB) sensor}, a bio sensor 240I, a temperature/humidity sensor 240J, an illuminance sensor 240K, or an ultra violet (UV) sensor 240M. The sensor module 240 further includes an E-nose sensor, an electromyography sensor (EMG), an electroencephalogram sensor (EEG), an electrocardiogram sensor (ECG), an infrared (IR) sensor, an iris sensor, or a fingerprint sensor, and/or the like. The sensor module 240 further includes a control circuit for controlling at least one sensor included therein. In various embodiments, the electronic device 201 further includes a processor to control the sensor module 240, as a part of the AP 210, or as a separate element and controls the sensor module 240 while the AP 210 is in a sleep mode.

The input device 250 includes a touch panel 252, a (digital) pen sensor 254, keys 256, or an ultrasonic input device 258. The touch panel 252 recognizes a touch input by at least one of, for example, a capacitive type, a pressure type, an infrared type, or an ultrasonic type. In addition, the touch panel 252 further includes a control circuit. The touch panel 252 further includes a tactile layer to provide a user with a tactile reaction.

The (digital) pen sensor 254, for example, is a part of the touch panel or includes a separate recognition sheet. The keys 256 include, for example, physical buttons, optical keys, or a keypad. The ultrasonic input device 258 detects acoustic waves with a microphone (e.g., a microphone 288) in the electronic device 201 through an input means that generates ultrasonic signals to thereby identify data.

The display 260 (e.g., the display 160) includes a panel 262, a hologram device 264, or a projector 266. The panel 262 includes the identical or similar elements to the display 160 of FIG. 1. The panel 262, for example, is implemented to be flexible, transparent or wearable. The panel 262 is configured with the touch panel 252 as a single module. The hologram device 264 display 3D images in the air by using interference of light. The projector 266 displays images by projecting light onto a screen. The screen is positioned, for example, inside or outside the electronic device 201. According to various embodiments, the display 260 further includes a control circuit for controlling the panel 262, the hologram device 264, or the projector 266.

The interface 270 includes, for example, a high-definition multimedia interface (HDMI) 272, a universal serial bus (UBS) 274, an optical interface 276, or a D-subminiature (D-sub) 278. The interface 270, for example, is included in the communication interface 160 shown in FIG. 1. The interface 270, for example, includes a mobile high-definition link (MHL) interface, a secure digital (SD) card/multi-media card (MMC) interface or an infrared data association (IrDA) standard interface.

The audio module 280 converts a sound into an electric signal, and vice versa. At least some elements of the audio module 280, for example, are included in the input/output interface 140 shown in FIG. 1. For example, the audio module 280 processes voice information input or output through a speaker 282, a receiver 284, earphones 286 or a microphone 288.

According to various embodiments of the present disclosure, the camera module 291 is a device for photographing still and moving images and includes at least one image sensor (e.g., a front sensor or a rear sensor), lenses, an image signal processor (ISP), or a flash (e.g., LED or a xenon lamp).

The power control module 295 manages power of the electronic device 201. According to various embodiments, the power management module 295 includes, for example, a power management integrated circuit (PMIC), a charger integrated circuit (IC), or a battery or fuel gauge. The PMIC is configured as a wired charging type or a wireless charging type. The wireless charging type encompasses, for example, a magnetic resonance type, a magnetic induction type or an electromagnetic wave type, and additional circuits for wireless charging, for example, coil loops, resonance circuits, rectifiers, or the like, is provided. The battery gauge measures, for example, the remaining power of the battery 296, a charging voltage and current, or temperature. The battery 296 includes, for example, a rechargeable battery or a solar battery.

The indicator 297 displays a specific state, for example, a booting state, a message state or a charging state of the electronic device 201 or a part (e.g., the AP 210) thereof. The motor 298 converts electric signals to a mechanical vibration, and provide a vibration effect or a haptic effect. The electronic device 201 includes a processing device (e.g., the GPU) for supporting mobile TV. The processing device for supporting mobile TV processes media data according to the standard, such as digital multimedia broadcasting (DMB), digital video broadcasting (DVB), or media flow.

Each of the components of the electronic device according to the present disclosure is implemented by one or more components and the name of the corresponding component varies depending on a type of the electronic device. In various embodiments, the electronic device includes at least one of the above-described elements. Some of the above-described elements are omitted from the electronic device, or the electronic device further includes additional elements. Further, some of the elements of the electronic device according to various embodiments of the present disclosure are coupled to form a single entity while performing the same functions as those of the corresponding elements before the coupling.

Figure 3:
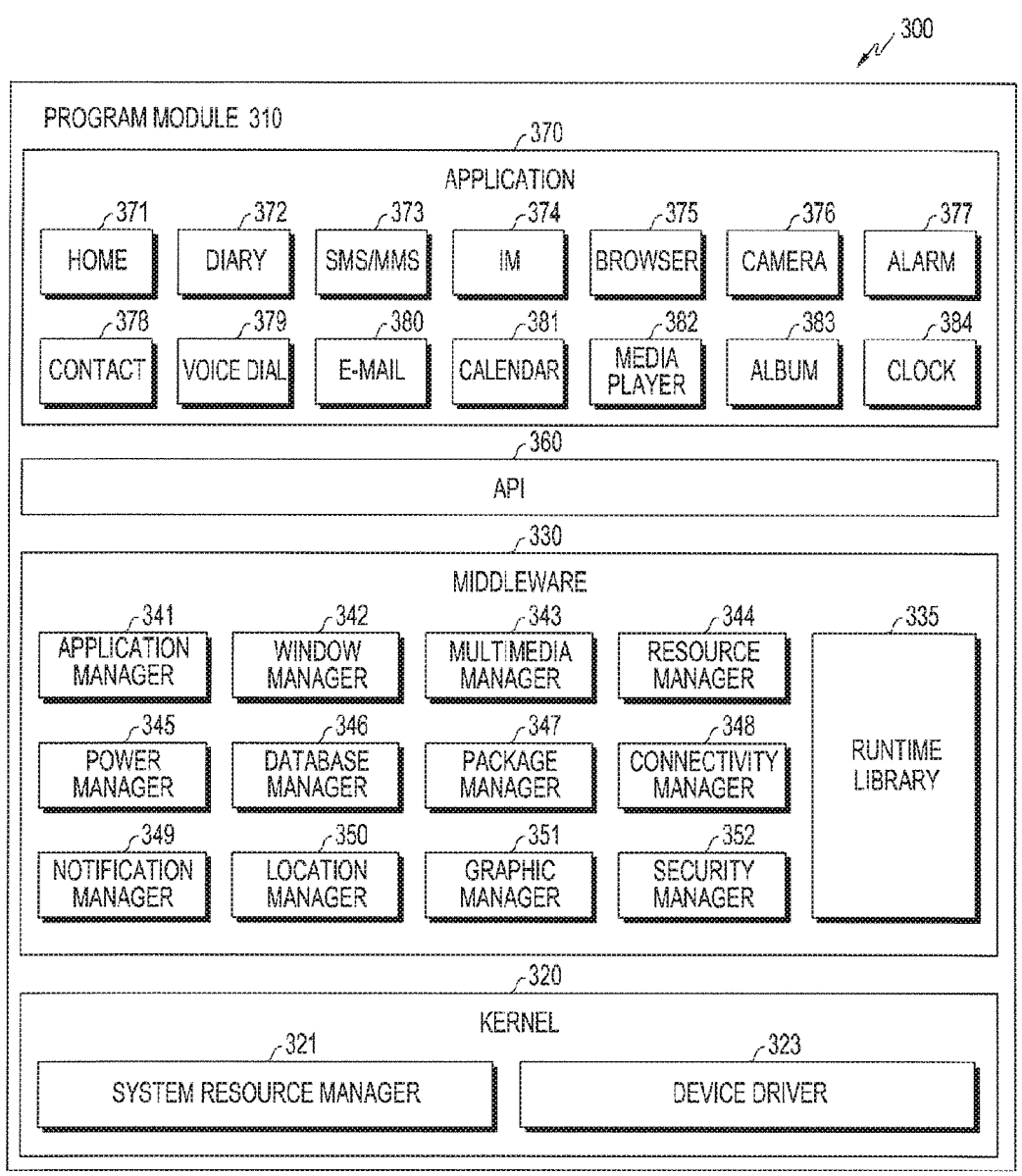
FIG. 3 illustrates a program module according to various embodiments of the present disclosure.

FIG. 3 is a block diagram 300 of a program module 310 according to various embodiments. According to various embodiments, the program module 310 (e.g., programs 140) includes an operating system (OS) that controls resources related to the electronic device (e.g., the electronic device 101), and/or various applications (e.g., application programs 147), which are executed under the OS. The OS, for example, is ANDROID, iOS, WINDOWS, SYMBIAN, TIZEN, BADA, or the like.

The program module 310 includes a kernel 320, a middleware 330, an application programming interface (API) 360, and/or applications 370. At least some of the program module 310 is pre-loaded in the electronic device or is downloaded from a server (e.g., the server 106).

The kernel 320 (e.g., the kernel 141 of FIG. 1), for example, includes a system resource manger 321 or a device driver 323. The system resource manager 321 performs control, allocation, or collection of system resources. According to various embodiments, the system resource manager 321 includes a process managing unit, a memory managing unit, or a file system managing unit. The device driver 323, for example, includes a display driver, a camera driver, a BLUETOOTH driver, a shared memory driver, a USB driver, a keypad driver, a Wi-Fi driver, an audio driver, or inter-process communication (IPC) driver.

The middleware 330, for example, provides common functions necessary for the applications 370, or provides various functions to the applications 370 through the API 360 so that the applications 370 can effectively use the limited system resources inside the electronic device. According to various embodiments, the middle ware 330 (e.g., the middleware 143) includes at least one of, for example, a run-time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The run-time library 335, for example, includes a library module that a compiler uses in order to add new functions through a programming language during execution of the applications 370. The run-time library 335 performs functions of managing an input/output, managing memories, or calculating formulas.

The application manager 341, for example, manages a life cycle of at least one of the applications 370. The window manager 342 manages a GUI resource used in a screen. The multimedia manager 343 recognizes a format necessary for reproduction of various media files, and performs encoding or decoding of the media files using a codec corresponding to the format. The resource manager 344 manages resources, such as a source code of at least one application 370, memories or storages.

The power manager 345 manages a battery or a power source in cooperation with a basic input/output system (BIOS), and provides power information required for the operation thereof. The database manager 346 manages creating, searching or changing of a database used in at least one of the applications 370. The package manager 347 manages an installation or an update of the application distributed in the form of a package file.

The connectivity manager 348 manages a wireless connection, such as Wi-Fi or BLUETOOTH. The notification manager 349 displays or notifies of events such as received massages, appointments, proximity notifications in a manner that does not disturb the user. The location manager 350 manages location information of the electronic device. The graphic manager 351 manages a graphic effect to be provided to the user and interfaces related thereto. The security manager 352 provides general security functions required for system security or user authentication. According to various embodiments, if the electronic device (e.g., the electronic device 101) adopts a phone call function, the middleware 330 further includes a telephony manager to manage a voice or video phone call function of the electronic device.

The middleware 330 includes a middleware module that constitutes a combination of various functions of the elements mentioned above. The middleware 330 provides modules that are specialized according to the type of operating system in order to provide differentiated functions. In addition, the middleware 330 dynamically removes some of the typical elements or add new elements.

The API 360 (e.g., the API 145), which is a group of API programming functions, is provided as a different configuration according to the operating systems. For example, in the case of ANDROID or iOS, for example, a single API set is provided to each of the platforms. In the case of TIZEN, for example, two or more API sets is provided thereto.

The applications 370 (e.g., the application programs 147) includes one or more applications that can provide functions of home 371, a diary 372, SMS/MMS 373, instant messaging (IM) 374, a browser 375, a camera 376, an alarm 377, contact 378, a voice dial 379, e-mail 380, calendar 381, a media player 382, an album 383, a clock 384, health care (e.g., measurement of exercise or blood sugar), providing environment information (e.g., atmospheric pressure, humidity, or temperature), or the like.

According to various embodiments, the applications 370 includes an application (hereinafter, referred to as an "information-exchange application"), which supports information exchange between the electronic device (e.g., the electronic device 101) and external electronic devices (e.g., the electronic devices 102 and 104). The information-exchange application includes, for example, a notification relay application for relaying specific information to the external electronic device, or a device management application for managing the external electronic device.

For example, the notification relay application includes a function of transferring notification information created in other applications (e.g., an SMS/MMS application, an e-mail application, a health care application, or an environmental information application) of the electronic device to the external electronic device (e.g., the electronic device 102 or 104). In addition, the notification relay application, for example, receives notification information from the external electronic device and provides the same to the user. The device management application, for example, manages (e.g., install, delete, or update) at least one function (e.g., turning the external electronic device (or some elements thereof) on or off, or adjusting the brightness (or resolution) of a display) of the external electronic device (e.g., the electronic device 104) that communicates with the electronic device, applications executed in the external electronic device, or services (e.g., a phone call service, or a messaging service) provided in the external electronic device.

According to various embodiments, the applications 370 includes applications (e.g., the healthcare application), which are assigned according to the properties (e.g., a mobile medical device according to the type of electronic device) of the external electronic device (e.g., the electronic device 102 or 104). According to various embodiments, the application 370 includes applications received from the external electronic device (e.g., the server 106 or the electronic device 102 or 104). According to various embodiments, the application 370 includes preloaded applications, or the third party applications that are downloadable from the server. The names of the elements of the program module 310 set forth above, according to the illustrated embodiment, varies with the type of operating system.

According to various embodiments, at least some of the program module 310 is implemented by software, firmware, hardware, or a combination thereof. At least some of the program module 310, for example, is implemented (e.g., executed) by a processor (e.g., the AP 210). At least some of the program module 310, for example, includes modules, programs, routines, sets of instructions, or processes in order to perform one or more functions.

The term "module" used in the present disclosure refer to, for example, a unit including one or more combinations of hardware, software, and firmware. The "module" is interchangeable with a term, such as a unit, a logic, a logical block, a component, or a circuit. The "module" is the smallest unit of an integrated component or a part thereof.

The "module" is a minimum unit for performing one or more functions or a part thereof. The "module" is mechanically or electronically implemented. For example, the "module" according to the present disclosure includes at least one of an Application-Specific Integrated Circuit (ASIC) chip, a Field-Programmable Gate Arrays (FPGA), and a programmable-logic device for performing operations which has been known or is to be developed hereinafter.

According to various embodiments, at least some of the devices (for example, modules or functions thereof) or the method (for example, operations) according to the present disclosure is implemented by a command stored in a computer-readable storage medium in a programming module form. The instruction, when executed by a processor (e.g., the processor 120), cause the one or more processors to execute the function corresponding to the instruction. The computer-readable storage medium is, for example, the memory 130.

The computer readable recoding medium includes a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory, and the like. In addition, the program instructions include high class language codes, which can be executed in a computer by using an interpreter, as well as machine codes made by a compiler. Any of the hardware devices as described above are configured to work as one or more software modules in order to perform the operations according to various embodiments of the present disclosure, and vice versa.

Any of the modules or programming modules according to various embodiments of the present disclosure includes at least one of the above described elements, exclude some of the elements, or further include other additional elements. The operations performed by the modules, programming module, or other elements according to various embodiments of the present disclosure are executed in a sequential, parallel, repetitive, or heuristic manner. Further, some operations are executed according to another order or are omitted, or other operations are added.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

According to one of various embodiments, the electronic device 101 (see FIG. 1) uses the IP network service, either the first external electronic device 102 (see FIG. 1) or the second external electronic device 104 (see FIG. 1) interworks with the electronic device 101 through non-IP messages. According to various embodiments, the non-IP messages denote messages transmitted and received in the non-IP-based network service. According to various embodiments, the electronic device 101 is a host electronic device (referred to as "the first electronic device" as well), such as a smart phone, a mobile phone, a notebook, a net-book, or the like, and either the first external electronic device 102 or the second external electronic device 104 is a wearable electronic device (referred to as "the second electronic device" as well), such as a watch, a headset, glasses, or the like. According to various embodiments, the wearable electronic device is a client electronic device that interworks with the host electronic device.

Figure 4:
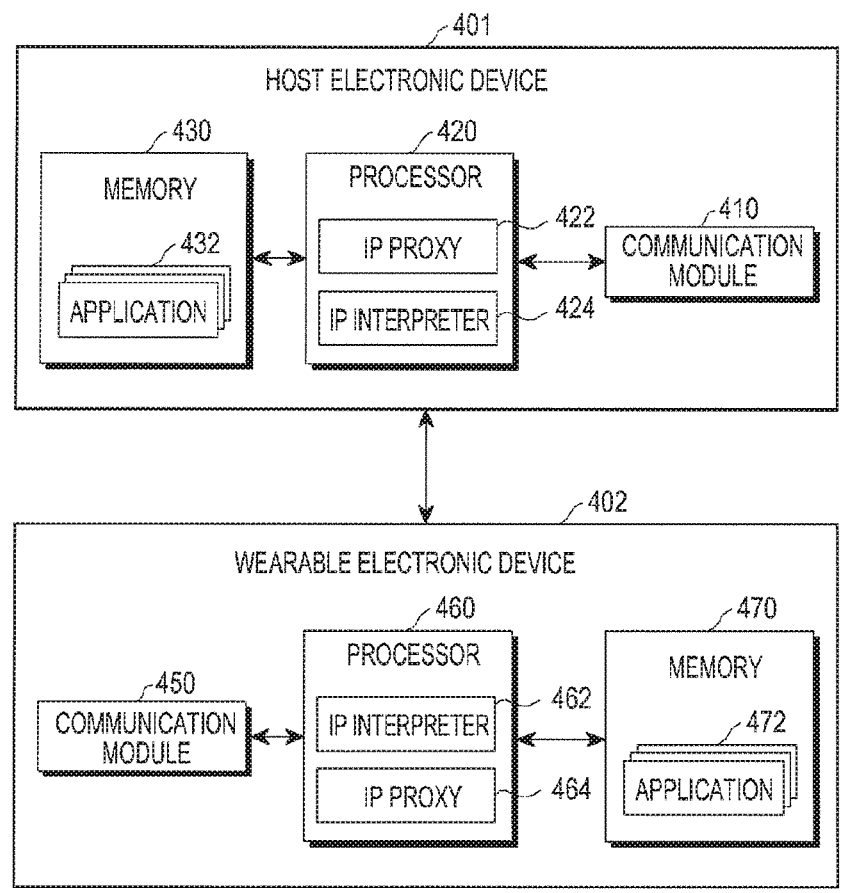
FIG. 4 illustrates a wearable electronic device and a host electronic device according to one of various embodiments of the present disclosure.

FIG. 4 illustrates a wearable electronic device and a host electronic device according to one of various embodiments.

Referring to FIG. 4, for example, the host electronic device 401 includes a communication module 410, a processor 420, and a memory 430.

For example, the communication module 410 includes an IP communication module, which can support IP-based network services, and a non-IP communication module, which can support non-IP-based network services. According to various embodiments, the non-IP communication module does not support the IP-based network services, and it include at least one of a BLUETOOTH communication module, a ZIGBEE communication module, an infrared communication module, a BLUETOOTH low energy (BLE) communication module, an audio communication module, a long term evolution (LTE) communication module, or a Wi-Fi communication module. Furthermore, any communication module, which does not support the IP-based network services, is the non-IP communication module. According to various embodiments, the IP communication module transmits and receives IP packets to and from the web server through the IP-based network service. The non-IP communication module transmits and receives non-IP messages to and from the wearable electronic device 402.

According to various embodiments, the processor 420 includes an Internet protocol (IP) proxy 422, and an IP interpreter 424. The IP proxy 422 collects IP requests from the applications 432. According to various embodiments, the IP proxy 422 processes the collected IP requests to transfer the same to an IP interpreter 462 of the host electronic device 401 using message exchange of the non-IP system.

The IP interpreter 424 creates non-IP service-based messages from the IP requests collected by the IP proxy 422. According to various embodiments, the IP interpreter 424 creates BLUETOOTH service-based messages including IP packets corresponding to the IP requests collected by the IP proxy 422, ZIGBEE service-based messages including IP packets corresponding to the IP requests collected by the IP proxy 422, infrared communication service-based messages including IP packets corresponding to the IP requests collected by the IP proxy 422, BLE service-based messages including IP packets corresponding to the IP requests collected by the IP proxy 422, or audio communication service-based messages corresponding to IP packets. Furthermore, the IP interpreter 424 creates LTE communication service-based messages, or Wi-Fi communication service-based messages.

When the non-IP-based messages are received, the IP interpreter 424 extracts IP packets from the non-IP-based messages. According to various embodiments, when the BLUETOOTH service-based messages are received, the IP interpreter 424 extract IP packets from the BLUETOOTH service-based messages, and when the ZIGBEE service-based messages are received, the IP interpreter 424 extracts IP packets from the ZIGBEE service-based messages. When the infrared communication service-based messages are received, the IP interpreter 424 extracts IP packets from the infrared communication service-based messages, and when the BLE service-based messages are received, the IP interpreter 424 extracts IP packets from the BLE service-based messages. In addition, when the audio communication service-based messages are received, the IP interpreter 424 extracts IP packets from the audio communication service-based messages. Furthermore, when the LTE communication service-based messages or the Wi-Fi communication service-based messages are received, the IP interpreter 424 extracts IP packets from the LTE communication service-based messages or the Wi-Fi communication service-based messages.

According to various embodiments, the processor 420 is a kind of physical device, and it performs functions of the IP proxy 422 and the IP interpreter 424. That is, the IP proxy 422 and the IP interpreter 424 are implemented as a single function. The processor 420 executes one or more applications 432 stored in the memory 430, and executes one or more applications, which can interwork with the wearable electronic device 402, among the applications 432. The processor 460 makes a control to transmit and receive the non-IP service-based messages to and from the wearable electronic device 402 using the non-IP communication module, according to the execution of the applications.

According to various embodiments, the memory 430 stores one or more applications 432. Some of the applications 432 interwork with the wearable electronic device 402. The memory 430 stores the IP packets received from the IP web server through the IP communication module or stores the non-IP messages received from the wearable electronic device 402 through the non-IP communication module.

For example, the wearable electronic device 402, which can interwork with the host electronic device 401 through the non-IP network, includes a communication module 450, a processor 460, and a memory 470.

According to various embodiments of the present disclosure, the communication module 450 includes an IP communication module, which provides IP network services, and a non-IP communication module, which provides non-IP network services. According to various embodiments, the wearable electronic device 402 is paired with the host electronic device 401 through the non-IP communication module. According to various embodiments, the wearable electronic device 402 communicates with the web server through the IP communication module. According to various embodiments, the wearable electronic device 402 communicates with the web server in a state in which the wearable electronic device 402 is not paired with the host electronic device 401. According to various embodiments, the wearable electronic device 402 transmits and receive the IP packets to and from the web server through the non-IP communication module via the host electronic device 401 in a state in which the wearable electronic device 401 is paired with the host electronic device 401.

The non-IP communication module, which does not support the IP network services, includes at least one of a BLUETOOTH communication module, a ZIGBEE communication module, an infrared communication module, a BLUETOOTH low energy (BLE) communication module, an audio communication module, a long term evolution (LTE) communication module, or a Wi-Fi communication module. Furthermore, any communication module that does not support the IP network services is the non-IP communication module. According to various embodiments, the IP communication module transmits and receives the IP packets to and from the web server through the IP-based network services. The non-IP communication module transmits and receives non-IP service-based messages to and from the host electronic device 401.

According to various embodiments, the processor 460 includes an Internet protocol (IP) proxy 462, and an IP interpreter 464.

When the non-IP messages are received, the IP interpreter 464 extracts IP packets from the non-IP messages. According to various embodiments, when the BLUETOOTH service-based messages are received, the IP interpreter 464 extracts IP packets from the BLUETOOTH service-based messages, and when the ZIGBEE service-based messages are received, the IP interpreter 464 extracts IP packets from the ZIGBEE service-based messages. When the infrared communication service-based messages are received, the IP interpreter 464 extracts IP packets from the infrared communication service-based messages, and when the BLE service-based messages are received, the IP interpreter 464 extracts IP packets from the BLE service-based messages. In addition, when the audio communication service-based messages are received, the IP interpreter 464 extracts IP packets from the audio communication service-based messages. Furthermore, when the LTE communication service-based messages or the Wi-Fi communication service-based messages are received, the IP interpreter 464 extracts IP packets from the LTE communication service-based messages or the Wi-Fi communication service-based messages.

The IP proxy 462 configures a communication channel to transfer an IP request corresponding to the IP packet extracted by the IP interpreter 464 to the web server.

The IP interpreter 464 converts an IP response, which is received from the web server in response to the IP request, into the non-IP-based message. According to various embodiments, the IP interpreter 464 creates a BLUETOOTH service-based message including an IP response received from the web server in response to the IP request, a ZIGBEE service-based message including an IP response received from the web server in response to the IP request, an infrared communication service-based message including an IP response received from the web server in response to the IP request, a BLE service-based message including an IP response received from the web server in response to the IP request, or an audio communication service-based message including an IP response received from the web server in response to the IP request. Furthermore, the IP interpreter 464 creates an LTE communication service-based message, or a Wi-Fi communication service-based message.

According to various embodiments, the processor 460 is a kind of physical device and performs functions of the IP proxy 462 and the IP interpreter 464. That is, the IP proxy 462 and the IP interpreter 464 are implemented as a single function. The processor 460 executes one or more applications 472 stored in the memory 470 and executes one or more applications, which can interwork with the host electronic device 401, among the applications 472. The processor 460 makes a control to transmit and receive the non-IP service-based messages to and from the host electronic device 401 using the non-IP communication module, according to the execution of the application.

According to various embodiments, the memory 470 stores one or more applications 472. Some of the applications 472 interwork with the host electronic device 401. The memory 470 stores the IP packets received from the IP web server through the IP communication module or stores the non-IP messages received from the host electronic device 401 through the non-IP communication module.

According to various embodiments, an electronic device includes: a memory; a communication module that transmits and receives messages; and a processor that, when a non-IP service-based message is received, creates an IP-based message including at least some of the non-IP service-based message, and provides the created IP-based message.

According to various embodiments, the processor includes: an IP proxy that configure a communication channel for transmitting and receiving an IP service-based message; and an IP interpreter that creates a non-IP service-based message including at least some of the IP service-based message for transmitting the IP service-based message, and when the non-IP service-based message is received, creates an IP service-based message from the non-IP service-based message.

According to various embodiments, the processor transfers the created IP-based message to the communication module or an application.

According to various embodiments, the communication module may not support an IP network service.

According to various embodiments, the communication module include at least one of a BLUETOOTH communication module, a ZIGBEE communication module, an infrared communication module, a BLUETOOTH low energy (BLE) communication module, an audio communication module, a long term evolution (LTE) communication module, or a Wi-Fi communication module.

According to various embodiments, the electronic device is a host electronic device or a client electronic device.

According to various embodiments, the client electronic device is connected with the host electronic device to operate when the client electronic device cannot perform IP communication by itself.

According to various embodiments, the electronic device further includes an IP communication module that transmits and receives IP service-based messages.

According to various embodiments, the processor, if the transmission of the non-IP service-based message including at least some of the IP service-based message is impossible, transmits and receives the IP service-based message using the IP communication module.

Figure 5:
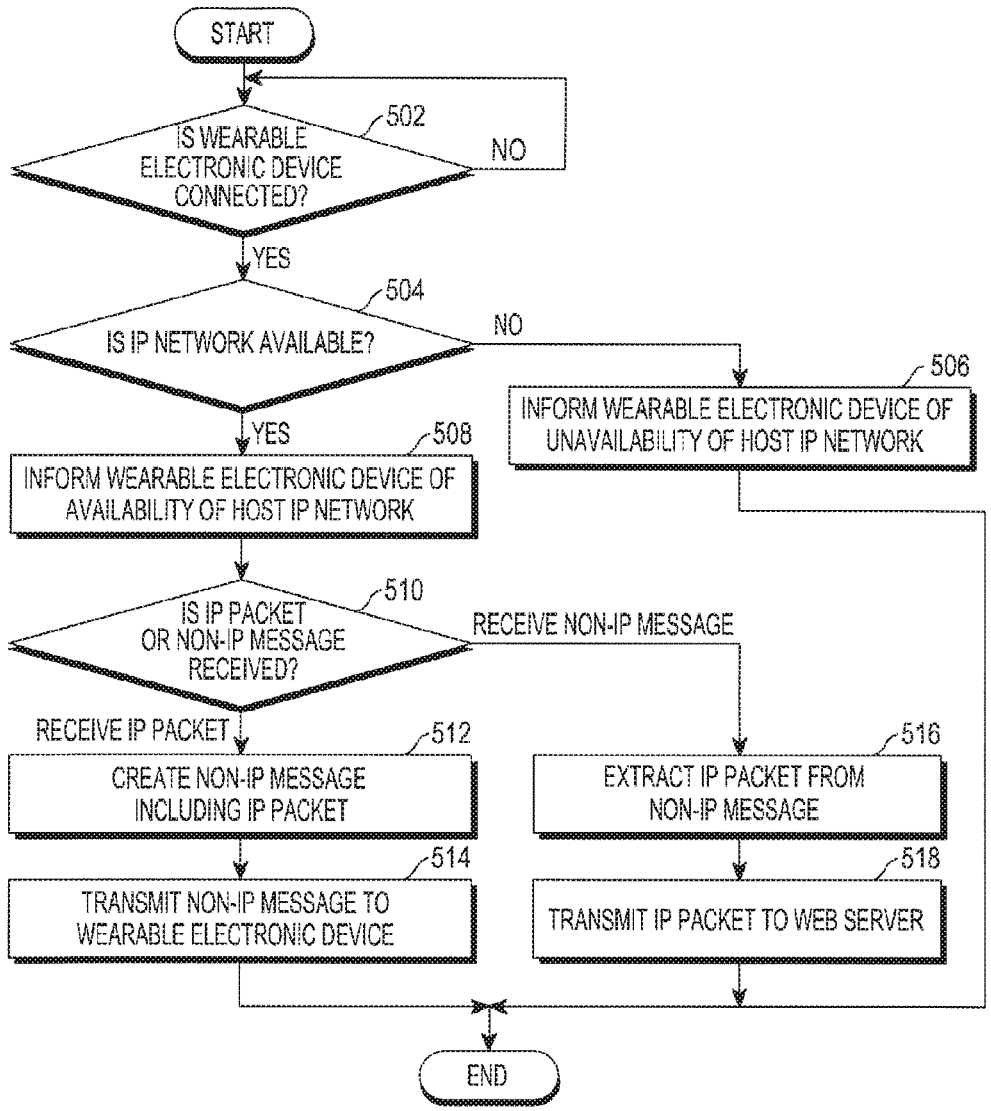
FIG. 5 is a flowchart illustrating the operation of a host electronic device according to one of various embodiments of the present disclosure.

FIG. 5 is a flowchart illustrating the operation of a host electronic device according to one of various embodiments. Referring to FIG. 5, the host electronic device 401 determines whether or not the host electronic device 401 is connected with the wearable electronic device 402 in operation 502.

According to various embodiments of the present disclosure, when the host electronic device 401 is connected with the wearable electronic device 402, the host electronic device 401 determines whether or not the IP network is available in operation 504. According to various embodiments, the host electronic device 401 determines whether or not the host electronic device 401 can transmit the IP packet, which is included in the non-IP message from the wearable electronic device 402, to the web server.

According to various embodiments of the present disclosure, if the IP network is not available, the host electronic device 401 informs the wearable electronic device 402 that the IP network is not available in operation 506. According to various embodiments, the host electronic device 401 transmits a non-IP-based message stating that the IP network is not available, to the wearable electronic device 402.

According to various embodiments of the present disclosure, if the IP network is available, the host electronic device 401 informs the wearable electronic device 402 that the IP network is available in operation 508. According to various embodiments, the host electronic device 401 transmits a non-IP-based message stating that the IP network is available, to the wearable electronic device 402.

According to various embodiments of the present disclosure, the host electronic device 401 determines whether or not the IP packet is received or the non-IP-based message is received in operation 510. According to various embodiments, the IP packet is received from the web server, and the non-IP message is received from the wearable electronic device 402.

According to various embodiments of the present disclosure, when the IP packet is received from the external web server, the host electronic device 401 creates a non-IP message including the IP packet in operation 512. According to various embodiments, the host electronic device 401 creates a BLUETOOTH message including the IP packet, a ZIGBEE message including the IP packet, an infrared signal corresponding to the IP packet, a BLE message including the IP packet, or an audio signal corresponding to the IP packet.

According to various embodiments of the present disclosure, the host electronic device 401 transfers the non-IP-based message to the wearable electronic device 402 in operation 514.

According to various embodiments of the present disclosure, when the non-IP-based message is received from the wearable electronic device 402, the host electronic device 401 extracts the IP packet included in the non-IP message in operation 516. According to various embodiments, the host electronic device 401 extracts the IP packet from the BLUETOOTH message, the ZIGBEE message, the infrared message signal, the BLE message, or the audio message signal.

According to various embodiments of the present disclosure, the host electronic device 401 transfers the extracted IP packet to the web server in operation 518.

According to the description above, the operations 510, 512, and 514 corresponds to the operation in which the host electronic device 401 receives an IP request for an IP-based service, such as a web service (e.g., NAVER), from the paired wearable electronic device 402 to thereby transfer the IP request to the external web server, and then receives the IP packet from the external web server. In this case, the host electronic device 401 creates non-IP service-based data corresponding to the received IP packet and transfers the non-IP service-based data to the final destination, i.e., the applications 472 of the wearable electronic device 402.

Meanwhile, the operations 510, 516, and 518 corresponds to the operation in which the host electronic device 401 receives a non-IP service-based message from the paired wearable electronic device 402 to extract the IP packet therefrom, and transfers the extracted IP packet to the web server.

Figure 6:
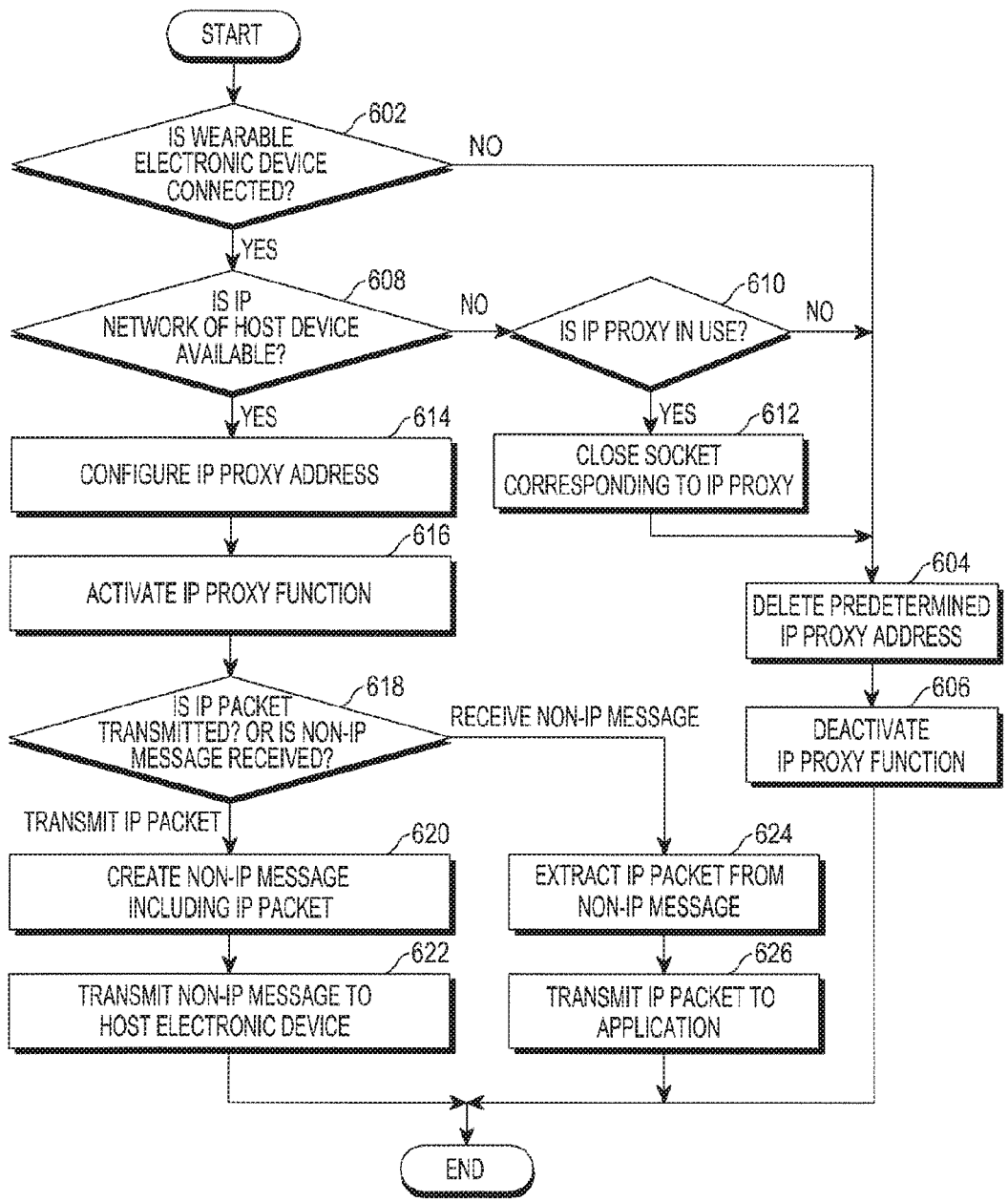
FIG. 6 is a flowchart illustrating the operation of a wearable electronic device according to one of various embodiments of the present disclosure.

FIG. 6 is a flowchart illustrating the operation of a wearable electronic device according to one of various embodiments. Referring to FIG. 6, according to various embodiments of the present disclosure, the wearable electronic device 402 determines whether or not the wearable electronic device 402 is connected with the host electronic device 401 in operation 602.

According to various embodiments of the present disclosure, when the wearable electronic device 402 is not connected with the host electronic device 401, the wearable electronic device 402 deletes a predetermined IP proxy address in operation 604 and deactivates an IP proxy function in operation 606. According to various embodiments, the predetermined IP proxy address is the IP address that is allocated to the wearable electronic device 402 in order to transmit and receive the IP packet.

According to various embodiments of the present disclosure, when the wearable electronic device 402 is connected with the host electronic device 401, the wearable electronic device 402 determines whether or not the host IP network is available in operation 608. According to various embodiments, the wearable electronic device 402 determines whether or not the IP packet can be transmitted to the web server through the host electronic device 401.

According to various embodiments of the present disclosure, if the IP network of the host electronic device 401 is not available, the wearable electronic device 402 determines whether or not the IP proxy is in progress in operation 610. According to various embodiments, the wearable electronic device 402 determines whether or not the data is in the process of being transmitted using the IP proxy.

According to various embodiments of the present disclosure, if the IP proxy is in progress, the wearable electronic device 402 closes a socket corresponding to the IP proxy in operation 612. According to various embodiments, the socket is a path through which the IP packet is transferred in order to creating the non-IP message including the IP packet. After closing the socket corresponding to the IP proxy, the wearable electronic device 402 performs the operations 604 and 606.

According to various embodiments of the present disclosure, if the host IP network is available, the wearable electronic device 402 configures an IP proxy address in operation 614, and activates an IP proxy function in operation 616. According to various embodiments, the IP proxy address is the address that is allocated to the wearable electronic device 402 in order to transmit and receive the IP packet.

According to various embodiments of the present disclosure, when the IP proxy function is activated, the wearable electronic device 402 determines whether or not the IP packet is to be transmitted or the non-IP-based message is received in operation 618.

According to various embodiments of the present disclosure, if the IP packet is to be transmitted, the wearable electronic device 402 creates a non-IP-based message including the IP packet in operation 620. According to various embodiments, the wearable electronic device 402 creates a BLUETOOTH message including the IP packet, a ZIGBEE message including the IP packet, an infrared signal corresponding to the IP packet, a BLE message including the IP packet, or an audio signal corresponding to the IP packet. The wearable electronic device 402 creates an LTE message including the IP packet, or a Wi-Fi communication message including the IP packet.

According to various embodiments of the present disclosure, the wearable electronic device 402 transfers the non-IP-based message to the host electronic device 401 in operation 622. When the non-IP-based message is transmitted to the host electronic device 401, the host electronic device 401 extracts the IP packet from the non-IP message to then transfer the same to the web server.

According to various embodiments of the present disclosure, when the non-IP message is received, the wearable electronic device 402 extracts the IP packet included in the non-IP message in operation 624. According to various embodiments, the wearable electronic device 402 extracts the IP packet from the BLUETOOTH message, the ZIGBEE message, the infrared message signal, the BLE message, or the audio message signal. Alternatively, the wearable electronic device 402 extracts the IP packet from the LTE message, or the Wi-Fi message.

According to various embodiments of the present disclosure, the wearable electronic device 402 provides the extracted IP packet to a corresponding application in operation 626.

According to the embodiment set forth above, the IP packet can be transmitted to the wearable electronic device 402, which does not support the IP network service, from the web server through the electronic device 401, and the IP packet can be transferred in the form of a non-IP message to the web server from the wearable electronic device 402, which does not support the IP network service, through the host electronic device 401.

Figures 7A, 7B:
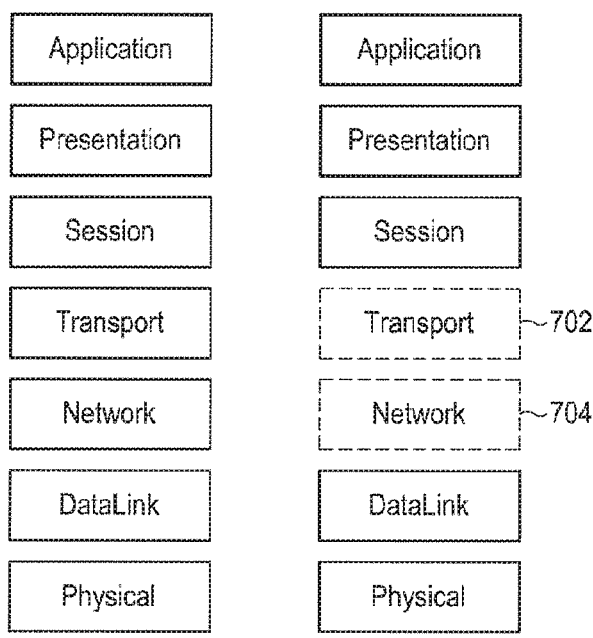
FIGS. 7A and 7B illustrate an example of creating a non-IP message according to one of various embodiments of the present disclosure.

FIGS. 7A and 7B illustrate an example of creating a non-IP message according to one of various embodiments. FIG. 7A shows the open system interconnection (OSI) 7 layers. In the case of transmitting the IP packet using the IP network, information corresponding to all of the OSI 7 layers is used as shown in FIG. 7A. According to various embodiments of the present disclosure, in the case of creating the non-IP message including the IP packet, information corresponding to some of the OSI 7 layers is omitted. According to various embodiments, in the case of creating the non-IP message including the IP packet, information corresponding to a transport layer 702 and a network layer 704 is omitted as shown in FIG. 7B.

FIGS. 8A and 8B illustrate an IP message and a non-IP message according to one of various embodiments. FIG. 8A shows an IP message and FIG. 8B shows a non-IP-based message. According to various embodiments, in the case of creating the non-IP-based message including the IP packet, an IP field 802 and a TCP field 804, which correspond to the transport layer 702 and the network layer 704 in FIG. 8A, respectively, is omitted to thereby create a non-IP-based message including a non-IP header 805 corresponding to the IP field 802 and the TCP field 804 as shown FIG. 8B. According to various embodiments, the non-IP header 805 is at least one of a BLUETOOTH communication-based header, a ZIGBEE communication-based header, an infrared communication-based header, an audio communication-based header, an LTE communication-based header, or a Wi-Fi communication-based header.

According to various embodiments, the IP interpreter 462 of the wearable electronic device 402 creates a non-IP service-based message including non-IP header information instead of the IP information and the TCP information from the IP service-based message to be transmitted. In addition, when the non-IP service-based message is received from the host electronic device 401, the IP interpreter 462 obtains the IP information and the TCP information using HTTP information included in the non-IP service-based message and creates the IP service-based message using the obtained IP information and the TCP information.

According to various embodiments, the IP interpreter 424 of the host electronic device 401 obtains the IP information and the TCP information using HTTP information included in the non-IP service-based message received from the wearable electronic device 402 to thereby create the IP service-based message and creates a non-IP service-based message including non-IP header information instead of the IP information and the TCP information from the IP service-based message received from the web server.

Figure 9:
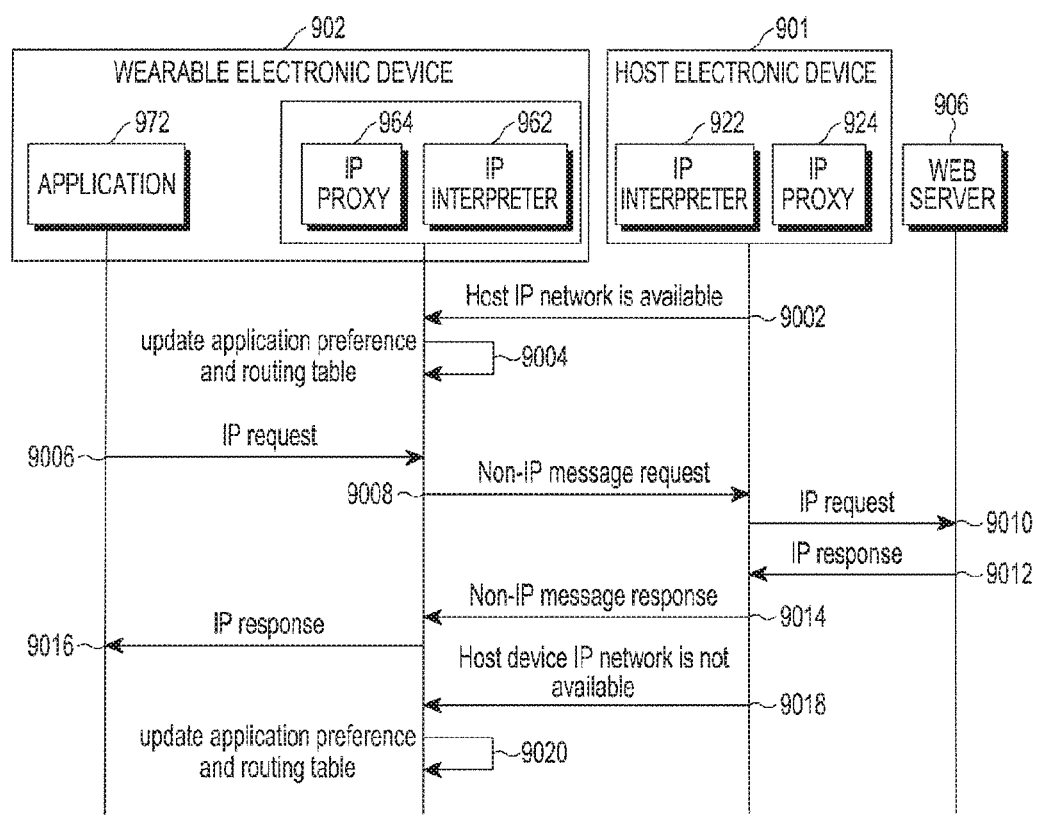
FIG. 9 is a flowchart illustrating an IP network service according to one of various embodiments of the present disclosure.

FIG. 9 is a flowchart illustrating an IP network service according to one of various embodiments. Referring to FIG. 9, if the host IP network is available, the host electronic device 901 transmit a message stating that the host IP network is available to the wearable electronic device 902 in operation 9002. According to various embodiments, the IP interpreter 924 transmits a non-IP message stating that the host IP network is available to the wearable electronic device 902.

According to one of the various embodiments of the present disclosure, when the message informing that the IP network is available is received, the IP proxy 964 of the wearable electronic device 902 updates application preferences and a routing table in operation 9004. According to various embodiments, when the message informing that the IP network is available is received, the IP proxy 964 configures an IP proxy address to thereby insert the IP proxy address in application preference information and updates the routing table so that an IP request of the application is transmitted through the IP proxy 964.

According to one of the various embodiments of the present disclosure, if an IP request is generated during the execution of the application 972, the application 972 transfers the IP request to the IP proxy 964 in operation 9006. With the transmission of the IP request to the IP proxy 964, the IP interpreter 962 creates a non-IP message including the IP request. The IP proxy 964 transmits the non-IP message request corresponding to the created non-IP message to the host electronic device 901 in operation 9008.

According to one of the various embodiments of the present disclosure, the IP interpreter 922 of the host electronic device 901 extracts the IP request from the non-IP message. The IP proxy 924 of the host electronic device 901 transmits the extracted IP request to the web server 906 in operation 9010.

According to one of the various embodiments of the present disclosure, the web server 906 transmits an IP response corresponding to the IP request to the host electronic device 901 in operation 9012.

According to one of the various embodiments of the present disclosure, the host electronic device 901 creates a non-IP message including the IP response through the IP interpreter 922, and transfers the non-IP message response to the wearable electronic device 902 through the IP proxy 924 in operation 9014.

When the wearable electronic device 902 receives the non-IP message response, the IP interpreter 962 extracts the IP response from the non-IP message response and transfers the extracted IP response to the application 972 in operation 9016.

According to one of the various embodiments of the present disclosure, if the host network is not available, the host electronic device 901 transmits a message informing that the host network is not available to the wearable electronic device 902 in operation 9018. According to various embodiments, the IP interpreter 924 transmits a non-IP message stating that the host IP network is not available to the wearable electronic device 902.

According to one of the various embodiments of the present disclosure, when the message informing that the host IP network is not available is received, the IP proxy 964 of the wearable electronic device 902 updates the application preferences and the routing table in operation 9020. According to various embodiments, when the message informing that the IP network is not available is received, the IP proxy 964 deletes a predetermined IP proxy address and updates the routing table so that the IP request of the application is not transmitted through the IP proxy 964.

According to one of the various embodiments of the present disclosure, the wearable electronic device 902 directly communicates with the web server 906 when the host IP network is not available. This operation is selectively performed.

Figure 10:
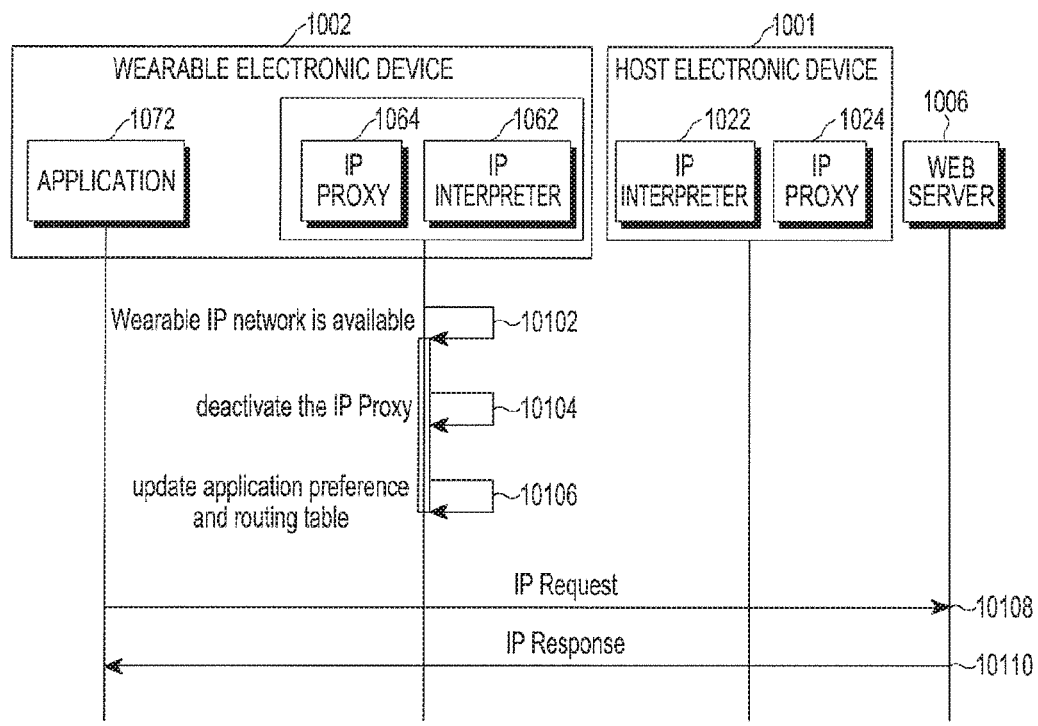
FIG. 10 a flowchart illustrating an IP network service wherein a wearable electronic device communicates with a web server without passing through a host electronic device according to one of various embodiments of the present disclosure.

FIG. 10 a flowchart illustrating an IP network service wherein a wearable electronic device communicates with a web server without passing through a host electronic device according to one of various embodiments.

Referring to FIG. 10, in the case where the wearable electronic device electronic device 1002 directly communicates with the web server 1006 without passing through the host electronic device 1001, the IP proxy 1064 determines whether or not the wearable IP network is available in operation 10102. If the wearable IP network is available, the IP proxy 1064 configures the IP proxy to be deactivated in operation 10014. The IP proxy 1064 updates application preferences and a routing table in operation 10106. According to various embodiments, the IP proxy 1064 deletes a predetermined IP proxy address from application preference information and updates the routing table so that the IP request of the application is transmitted not through the IP proxy 1064 but through the IP communication module.

According to one of the various embodiments of the present disclosure, the application 1072 directly transmits an IP request to the web server 1006 through the IP communication module in operation 10108. The web server 1006 directly transmits an IP response to the wearable electronic device 1002 in response to the IP request in operation 10110.

According to various embodiments, an IP network service method of an electronic device includes: creating a non-IP service-based message including at least some of an IP service-based message for transmitting the IP service-based message; and transmitting the non-IP service-based message including at least some of the IP service-based message.

According to various embodiments, the method further includes: receiving a non-IP service-based message including at least some of an IP service-based message; and creating an IP service-based message from the received non-IP service-based message.

According to various embodiments, the method further includes storing the received non-IP service-based message.

According to various embodiments, the non-IP service-based message is received through communication that does not support an IP network service.

According to various embodiments, the communication, which does not support an IP network service, is at least one of BLUETOOTH communication, ZIGBEE communication, infrared communication, BLUETOOTH low energy (BLE) communication, audio communication, long term evolution (LTE) communication, or Wi-Fi communication.

According to various embodiments, the electronic device is a host electronic device or a client electronic device.

According to various embodiments, the method further includes, if the transmission of the non-IP service-based message including at least some of the IP service-based message is impossible, transmitting and receiving the IP service-based message using an IP communication module.

Each of the above described elements of the electronic device according to various embodiments of the present disclosure is formed of one or more components, and the name of a corresponding element varies according to the type of an electronic device. The electronic device according to various embodiments of the present disclosure includes at least one of the above described elements and excludes some of the elements or further includes other additional elements. Further, some of the elements of the electronic device according to various embodiments of the present disclosure are coupled to form a single entity while performing the same functions as those of the corresponding elements before the coupling.

The term "module" used in the various embodiments of the present disclosure refers to, for example, a unit including one or more combinations of hardware, software, and firmware. The "module" is interchangeable with a term, such as a unit, a logic, a logical block, a component, or a circuit. The "module" is the smallest unit of an integrated component or a part thereof. The "module" is a minimum unit for performing one or more functions or a part thereof. The "module" is mechanically or electronically implemented. For example, the "module" according to various embodiments of the present disclosure include at least one of an application-specific integrated circuit (ASIC) chip, a field-programmable gate array (FPGA), and a programmable-logic device for performing certain operations, which are now known or will be developed in the future.

At least some of the devices (e.g., modules or functions thereof) or methods (e.g., operations) according to various embodiments of the present disclosure are implemented by, for example, by a command stored in a computer-readable storage medium in the form of a programming module. When the command is executed by one or more processors (e.g., the processor 120 in FIG. 1), the one or more processors perform a function corresponding to the command. The computer-readable storage medium is, for example, the memory 130 in FIG. 1. At least a part of the programming module is implemented (e.g., executed) by, for example, the processor 120 in FIG. 1. At least a part of the programming module may, for example, include a module, a program, a routine, a set of instructions, or a process for performing at least one function.

The computer-readable recording medium includes magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory and the like. In addition, the program instructions include high class language codes, which can be executed in a computer by using an interpreter, as well as machine codes made by a compiler. Any of the hardware devices as described above is configured to work as one or more software modules in order to perform the operations according to various embodiments of the present disclosure, and vice versa.

Any of the modules or programming modules according to various embodiments of the present disclosure includes at least one of the above described elements, exclude some of the elements, or further include other additional elements. The operations performed by the modules, programming module, or other elements according to various embodiments of the present disclosure are executed in a sequential, parallel, repetitive, or heuristic manner. Further, some operations are executed according to another order or are omitted, or other operations are added.

According to various embodiments, a recording medium stores instructions (or programs) that execute, in an electronic device, the operations of: creating a non-IP service-based message including at least some of an IP service-based message for transmitting the IP service-based message; and transmitting the created non-IP service-based message. According to various embodiments, the instructions execute, in an electronic device, the operations of: receiving a non-IP service-based message including at least some of an IP service-based message; and creating an IP service-based message from the received non-IP service-based message.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wearable electronic device comprising:
a first communication module configured to establish a short-range communication with an external communication device;
a second communication module configured to establish a cellular communication with an external internet protocol (IP) network; and
a processor configured to:
while the wearable electronic device is connected with the external communication device via the short-range communication, determine whether the external IP network is accessible via the external communication device, based on information obtained from a first short-range communication message obtained from the external communication device via the short-range communication;
based on a determination that the external IP network is accessible via the external communication device, transmit a second short-range communication message corresponding to an IP packet to the external communication device using the first communication module, such that the external communication device is to transmit the IP packet over the external IP network based on the second short-range communication message; and
based on a determination that the external IP network is not accessible via the external communication device, transmit the IP packet or another IP packet over the external IP network using the second communication module.

2. The wearable electronic device of claim 1, wherein the processor is further configured to configure a communication channel for transmitting and receiving an IP service-based message.

3. The wearable electronic device of claim 1, wherein the processor is further configured to create a non-IP service-based response message including an IP response.

4. The wearable electronic device of claim 1, wherein the short-range communication includes at least one of a BLUETOOTH communication, a ZIGBEE communication, an infrared communication, a BLUETOOTH low energy (BLE) communication or an audio communication.

5. The wearable electronic device of claim 1, wherein the external communication device is a host device.

6. The wearable electronic device of claim 1, wherein the processor is further configured to create the second short-range communication message including an IP request.

7. A method for controlling a wearable electronic device comprising:
while the wearable electronic device is connected with an external communication device via a short-range communication, determine whether an external IP network is accessible via the external communication device, based on information obtained from a first short-range communication message obtained from the external communication device via the short-range communication;
based on a determination that the external IP network is accessible via the external communication device, transmit a second short-range communication message corresponding to an IP packet to the external communication device using a first communication module, such that the external communication device is to transmit the IP packet over the external IP network based on the second short-range communication message; and based on a determination that the external IP network is not accessible via the external communication device, transmit the IP packet or another IP packet over the external IP network using a second communication module.

8. The method of claim 7, wherein the method is further comprising configuring a communication channel for transmitting and receiving an IP service-based message.

9. The method of claim 7, wherein the method is further comprising creating a non-IP service-based response message including an IP response.

10. The method of claim 7, wherein the short-range communication includes at least one of a BLUETOOTH communication, a ZIGBEE communication, an infrared communication, a BLUETOOTH low energy (BLE) communication or an audio communication.

11. The method of claim 7, wherein the external communication device is a host device.

12. The method of claim 7, wherein the method is further comprising creating the second short-range communication message including an IP request.

\* \* \* \* \*